(12) United States Patent
O'Brien et al.

(10) Patent No.: US 7,654,168 B2
(45) Date of Patent: Feb. 2, 2010

(54) DETENT SPRING

(75) Inventors: Thomas M. O'Brien, Rochester Hills, MI (US); Lee I. Silva, Macomb Township, MI (US); Michael A. Bartolino, Clinton Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 491 days.

(21) Appl. No.: 11/551,378

(22) Filed: Oct. 20, 2006

(65) Prior Publication Data

US 2008/0141816 A1   Jun. 19, 2008

(51) Int. Cl.
*G05G 5/08* (2006.01)
*G05G 5/06* (2006.01)
*F16F 1/18* (2006.01)

(52) U.S. Cl. ............... 74/473.25; 74/532; 267/163
(58) Field of Classification Search ............ 74/473.24, 74/473.25, 527, 531, 532, 533, 534, 535; 267/158, 163, 260

See application file for complete search history.

(56) References Cited

U.S. PATENT DOCUMENTS

| | | | | |
|---|---|---|---|---|
| 4,062,291 A | * | 12/1977 | Vick et al. | 104/10 |
| 5,277,078 A | * | 1/1994 | Osborn et al. | 74/473.28 |
| 6,431,339 B1 | * | 8/2002 | Beattie et al. | 192/220.4 |
| 6,658,960 B2 | * | 12/2003 | Babin et al. | 74/473.28 |

* cited by examiner

*Primary Examiner*—Thomas R Hannon
*Assistant Examiner*—James Pilkington
(74) *Attorney, Agent, or Firm*—Ralph E. Smith

(57) ABSTRACT

A detent spring assembly that accurately locates a detent plate in a gear shift mechanism of an automotive vehicle has a detent spring which includes an elongated flexible strip. A roller on the strip is engageable with any one of a series of notches in the detent plate to properly position the detent plate. A fastener secures the detent spring to a support. A part on the strip engages the support at a point spaced from the fastener to cooperate with the fastener in accurately and precisely locating the strip.

12 Claims, 2 Drawing Sheets

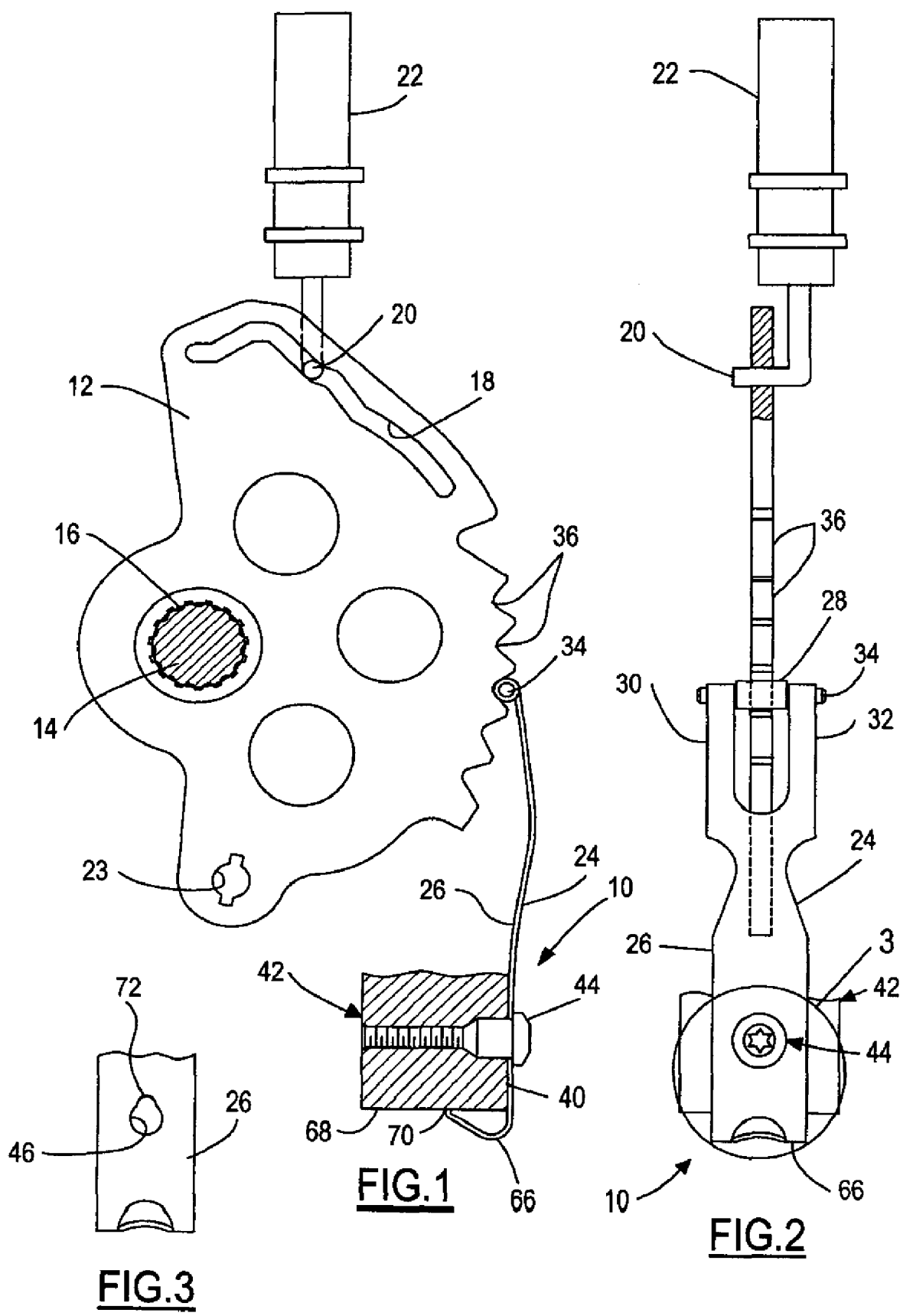

DETENT SPRING

FIELD OF THE INVENTION

This invention relates generally to detent assemblies and more particularly to a dent spring for locating a detent plate in the gear shift mechanism of an automotive vehicle.

BACKGROUND OF THE INVENTION

A typical gear shift mechanism of an automotive vehicle has a rotary detent plate for shifting the transmission into any one of several positions including, for example, "park", "reverse", "neutral", "drive", and "low". The detent plate is rotated manually by a driver of the vehicle who moves a gear shift level to the desired position and this movement is transferred to the detent plate.

A detent spring is provided to accurately locate the detent plate.

The detent spring is usually mounted by a pair of fasteners which must be spaced apart far enough to ensure that the detent spring is accurately and precisely located. A problem arises when there is not sufficient available space for the two fasteners.

SUMMARY OF THE INVENTION

In accordance with the present invention, a detent spring is provided which is mounted by a single fastener, but which has a separate locating feature that cooperates uniquely with the single fastener to ensure accurate and precise location of the detent spring.

Preferably the detent spring has a detent plate-engaging part at one end which might be a simple roller, and a tail at the opposite end which cooperates with the single fastener to ensure accuracy of location of the detent spring.

More specifically, and further in accordance with the invention, the tail end of the detent plate is cooperable with the backside of a mounting block to which the detent spring is fastened. Preferably the tail end has a terminal edge engaged with a flat surface on the backside of the mounting block. The tail end of the detent spring in cooperation with the single fastener locates the detent spring very accurately both in a lengthwise direction and from side-to-side.

The fastener which mounts the detent spring on the mounting block preferably has a camming action on the detent spring to facilitate the insertion of the fastener into an opening in the detent spring.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 1 is a plan view with parts in section showing a detent spring mounted by a single fastener in a position to engage a notched edge of a detent plate, in accordance with the invention;

FIG. 2 is a side view of the structure shown in FIG. 1;

FIG. 3 is a fragmentary detail showing a portion of the detent spring within the circle 3 in FIG. 2;

DETAILED DESCRIPTION OF THE PREFERRED EMBODIMENT

Figure 4:
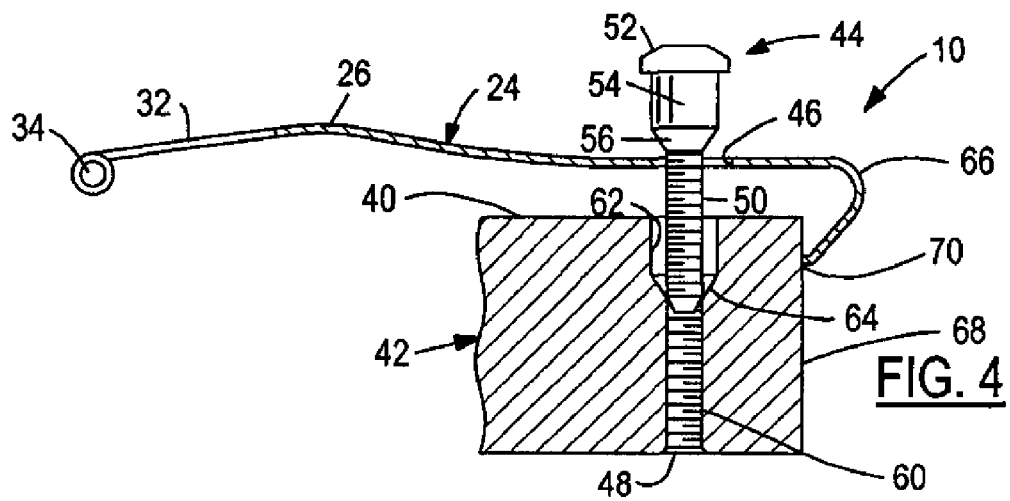
FIG. 4 is a sectional view showing the detent spring before it is secured to a mounting block by a fastener.

The following description of the preferred embodiment is merely exemplary in nature and is in no way intended to limit the invention, its application, or uses.

Referring now more particularly to the drawings, there is shown a detent spring assembly 10 for locating a rotary detent plate 12 in a gear shift mechanism (not shown) of an automotive vehicle. The detent plate 12 is adapted to be rotated by the driver of a vehicle who moves a gear shift lever (not shown) to the desired position and that movement is transferred to the detent plate 12 by a shaft 14 engaged in a hole 16 in the detent plate.

The detent plate has a cam track 18, sometimes called a "worm track", in which a valve pin 20 is engaged. The valve pin 20 reciprocates a valve 22 that directs fluid as required to place the transmission in "drive", "reverse", etc. A park rod (not shown) for setting a "park" brake is also attached to the detent plate 12 in an opening 23 in the detent plate.

The detent spring assembly 10 is provided to very accurately and precisely locate the rotative position of the detent plate 12. The detent spring assembly 10 comprises a detent spring 24 having an elongated, flexible, resilient strip 26 of metal or other suitable flexible and resilient material. A roller 28 on the front end of the strip 26 extends perpendicular to the longitudinal centerline of the strip. Specifically, the roller 28 is rotatably mounted between a pair of laterally spaced apart arms 30 and 32 on a transverse pin 34 extending from one arm to the other. The roller 28 is adapted to engage in any one of a series of notches 36 along an outer edge of the detent plate 12 to serve as a locator for the detent plate. The flexibility and resilience of the strip 26 allows the roller 28 to cam over the notches 36 and settle into a selected one of the notches.

The strip 26 is secured to a flat horizontal mounting surface 40 of a support in the form of a mounting block 42 by a fastener 44. The fastener 44 is shown as a screw that extends through a hole 46 near the rear end of the strip 26 and threads into a bore 48 in the mounting block 42. The fastener has a threaded shank 50 and a head 52. Between the shank 50 and the head 52 is a cylindrical neck 54 of a diameter larger than the shank but smaller than the head which is connected to the shank by a tapering frusto-conical mid-portion 56. The bore 48 in the mounting block 42 has a threaded portion 60 into which the shank 50 of the fastener 44 threads, a cylindrical upper end portion 62 into which the cylindrical neck 54 of the fastener closely fits, and a tapering frusto-conical portion 64 to closely receive the tapering portion 56 of the fastener.

The strip 26 has a tail or tail end 66 that cooperates with the single fastener 44 to insure accuracy of location of the detent spring 24. The tail end 66 comprises an integral rear end portion of the strip 26 that is return-bent or curved back toward the front end of the strip in a generally U-shape. The tail end 66 is spaced rearwardly from the hole 46 in the strip 26.

The mounting block 42 has a flat rear surface 68 that is perpendicular to the mounting surface 40. The terminal edge 70 of the tail end 66 is straight and extends perpendicular to the lengthwise dimension of the strip 26 and has a continuous line contact with the flat rear surface 68 of the mounting block 42 throughout the full length of the terminal edge.

The hole 46 in the strip 26 is circular throughout most of its circumferential extent but has a radially outward arcuate bulge or extension 72 along its front edge for a purpose which will be explained later in this description.

Figure 5:
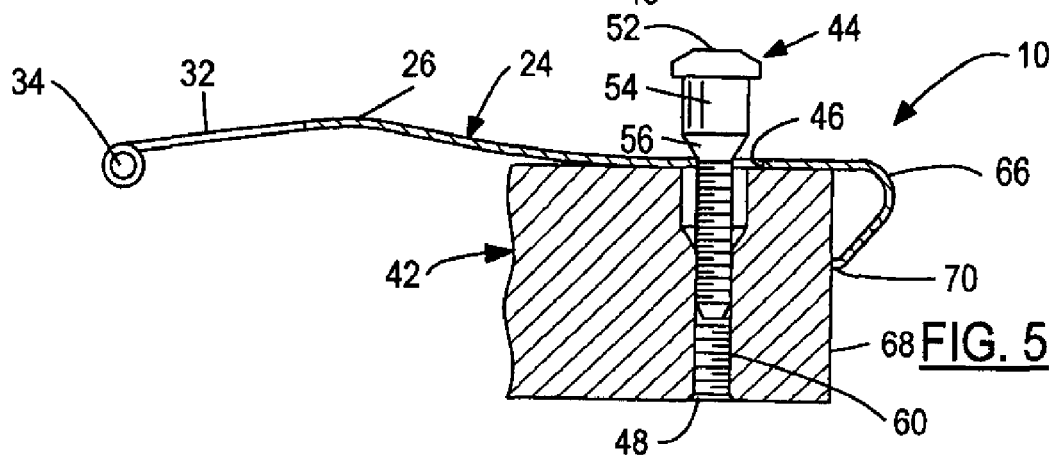
FIG. 5 is a view similar to FIG. 4, but shows the fastener partially inserted.
Figure 6:
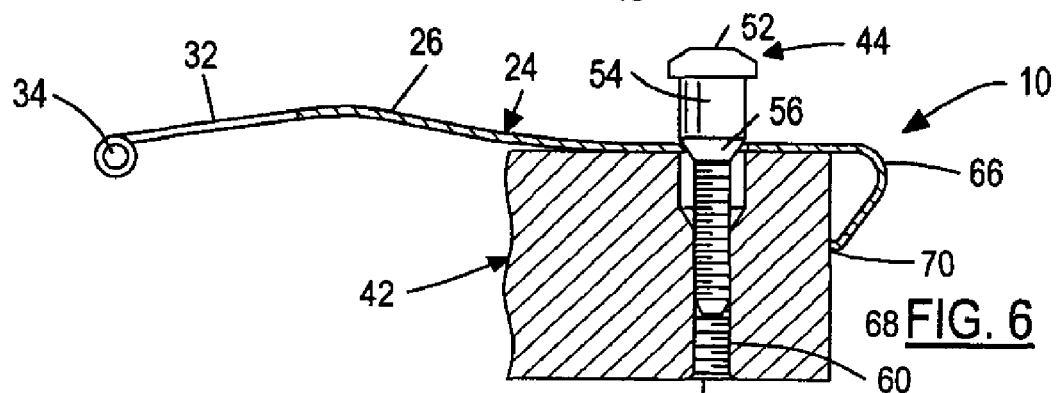
FIG. 6 is a view similar to FIGS. 4 and 5, but shows the fastener further inserted.
Figure 7:
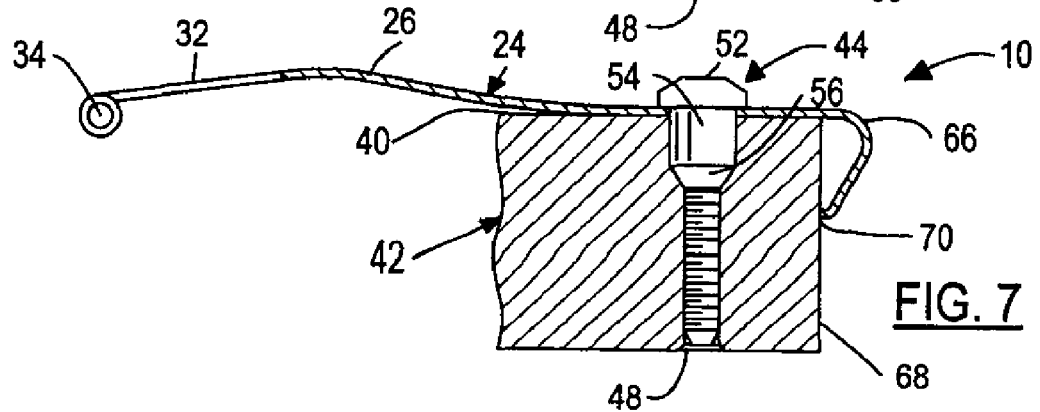
FIG. 7 is a view similar to FIGS. 4-6, but shows the fastener fully inserted.

The detent strip 26 is shown in its natural free-state condition in FIGS. 4 and 5. FIGS. 6 and 7 show the detent spring in which the tail end 66 is expanded somewhat under tension by opening the generally U-shape a small degree to place the tail end in tension.

The sequence of steps in the installation of the detent spring 24 on the mounting block 42 is shown in FIGS. 4-7. FIG. 4 shows the fastener 44 inserted in the hole 46 of the strip 26. Actually, the shank 50 of the fastener is shown in FIG. 4 partially occupying the radial bulge or extension 72 of the hole to allow the shank to initially enter the threaded portion 60 of the bore 48 without stressing the tail end of the strip 26 which is shown initially in light, non-pressure contact with the rear surface 68 of the mounting block 42. This makes it easier for the person making the installation to extend the nose of the fastener 44 into the hole 46 without stressing the tail end 66 of the strip.

FIG. 5 shows the fastener 44 partially threaded into the threaded portion 60 of the bore 48, but without applying any stress on the tail end 66. The tail end at this point is still only in light contact with the rear surface 60 of the mounting block 42.

FIG. 6 shows the fastener 44 further threaded into the threaded portion 60 of the bore 46, and it will be noted that the frusto-conical mid-portion 56 of the fastener has now cammed the strip 26 forwardly or to the left in FIG. 6, placing a degree of spring stress on the tail end 66, causing the tail end to open or expand somewhat and the terminal edge 70 of the tail end to press firmly under resilient pressure against the rear surface 66 of the mounting block.

The camming action of the fastener 44 on the detent spring 24 longitudinally loads the detent spring into a precisely located configuration within a relatively confined space.

FIG. 7 shows the fastener 44 fully inserted in the bore 48, placing additional stress on the tail end 66 by opening the tail end further and by pressing the terminal edge 70 of the tail end more firmly against the rear surface of the mounting block under further resilient pressure in a continuous line contact therewith throughout its full extent.

By reason of the fact that the strip 26 is firmly and securely mounted at two points, namely the point where the fastener 44 is installed and the point where the terminal edge 70 of the tail end 66 engages the rear surface 60 of the mounting block 42, the detent spring 24 is very accurately and precisely located in a lengthwise direction and also in a lateral direction or from side-to-side.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A detent spring assembly for accurately locating a detent plate in a gear shift mechanism of an automotive vehicle comprising:

a detent spring comprising an elongated flexible strip, a locator on said strip engageable with any one of a series of notches in the detent plate to properly position the detent plate, a support including a mounting block having a flat mounting surface and a second surface disposed perpendicular to said flat mounting surface, a fastener securing the detent spring to the mounting surface of the mounting block, and a tail portion on said strip disposed at an end of said strip opposite of said locator, said tail portion being return bent toward said locator into a U-shape, said U-shape including a terminal end engaging said second surface of said mounting block under resilient pressure at a point spaced apart from said fastener to cooperate with said fastener in accurately and precisely locating said strip.

2. The detent spring assembly of claim 1, wherein said locator comprises a roller rotatably mounted on a front end of the flexible strip.

3. The detent spring assembly of claim 1, wherein said tail portion comprises an integral portion of said flexible strip.

4. The detent spring assembly of claim 1, wherein the second surface of the mounting block is flat and the terminal end of said tail portion is straight and has a continuous contact with the second flat surface of the mounting block throughout the full length of the terminal end.

5. The detent spring assembly of claim 4, wherein said locator comprises a roller rotatably mounted on a front end of the strip.

6. The detent spring assembly of claim 1, wherein said second surface includes a flat surface disposed perpendicular to said mounting surface and located on a side of said mounting block positioned furthest from said locator.

7. A detent spring assembly for accurately locating a rotatable detent plate in a gear shift mechanism of an automotive vehicle comprising:

a detent spring comprising an elongated flexible, resilient strip, a locator mounted on a front end of said strip engageable with any one of a series of notches in the detent plate to properly position the detent plate, a support comprising a mounting block having a flat mounting surface, a fastener securing the strip to the mounting block, said fastener extending through a hole in said strip and threaded into a bore in the mounting surface of said mounting block, said mounting block having a second planar surface disposed perpendicular to said flat mounting surface, said second surface being longitudinally spaced apart from said bore in said mounting surface and located on a rear side of said mounting block positioned furthest from said locator, and said strip having a tail portion at a rear end of said strip opposite of the front end of said strip, said tail portion having a terminal end, said strip cooperating with said fastener to have the terminal end engage said second surface of the mounting block under resilient pressure to accurately and precisely locate said strip.

8. The detent spring assembly of claim 7, wherein said tail portion comprises an integral portion of said flexible strip.

9. The detent spring assembly of claim 8, wherein said tail portion is return bent back toward the front end of the strip into a U-shape, said U-shape having the terminal end engaging the second surface of said mounting block under resilient pressure.

10. The detent spring assembly of claim 9, wherein terminal end of said U-shaped tail portion is straight and has a continuous line contact with the second planar surface of the mounting block throughout the full length of the terminal end.

11. The detent spring assembly of claim 10, wherein said hole in the strip is circular throughout most of its circumferential extent but has an arcuate extension along a front edge of the hole positioned in a direction facing the locator, said fastener partially occupying said extension of said hole during initial entry of said fastener into said hole to facilitate such initial entry without placing any stress on the tail portion, said fastener having a frusto-conical mid-portion engaging said hole during further entry of said fastener in said hole to cam said strip forwardly towards said detent plate and thereby press the terminal end of the tail portion more firmly against said second planar surface under spring pressure.

12. The detent spring assembly of claim 11, wherein said locator comprises a roller.

* * * * *